(No Model.) 3 Sheets—Sheet 3.
G. STEVENS.
METHOD OF AND MEANS FOR PREVENTING SOLIDIFICATION BY FROST, &c., OF LIQUIDS IN PIPES.
No. 583,096. Patented May 25, 1897.
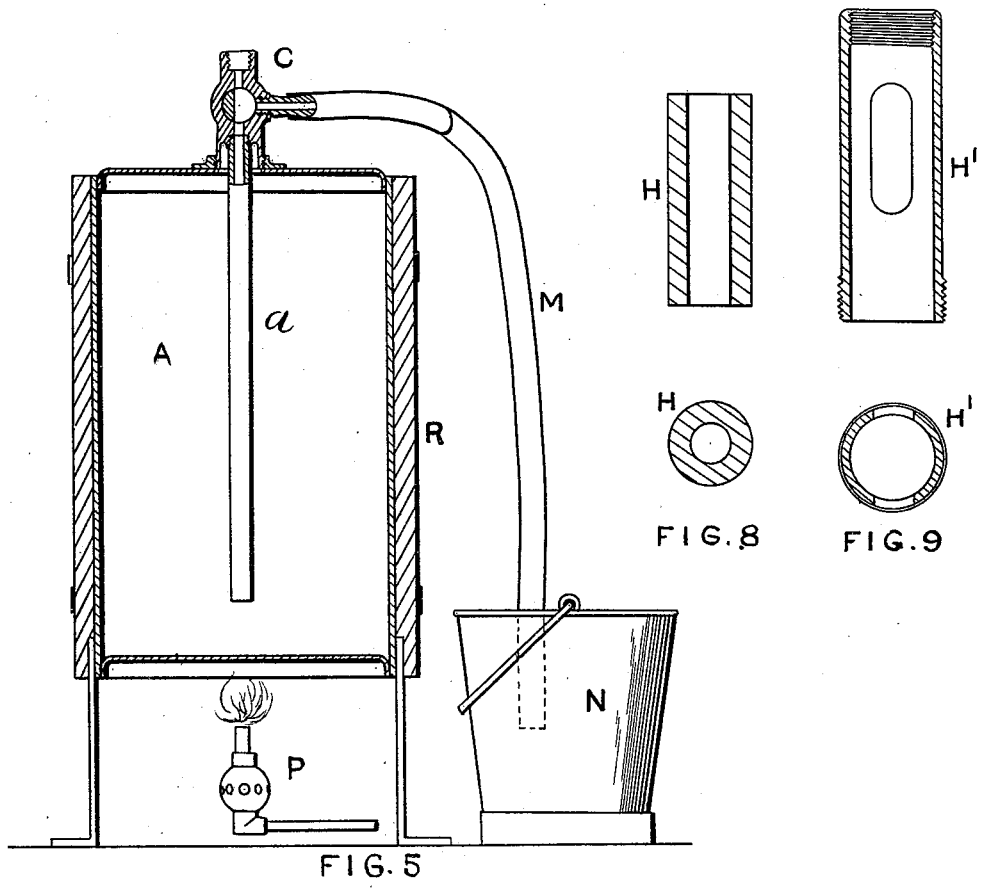
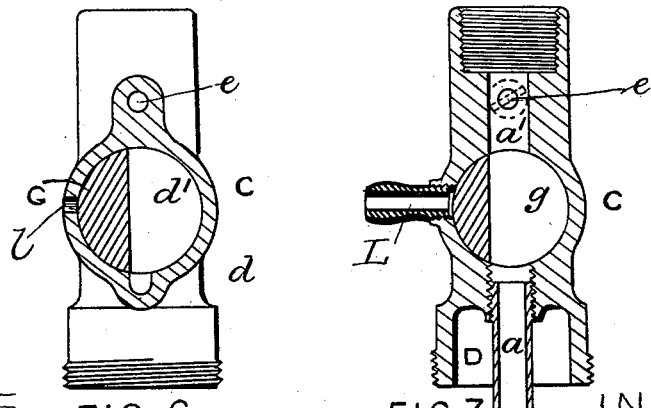

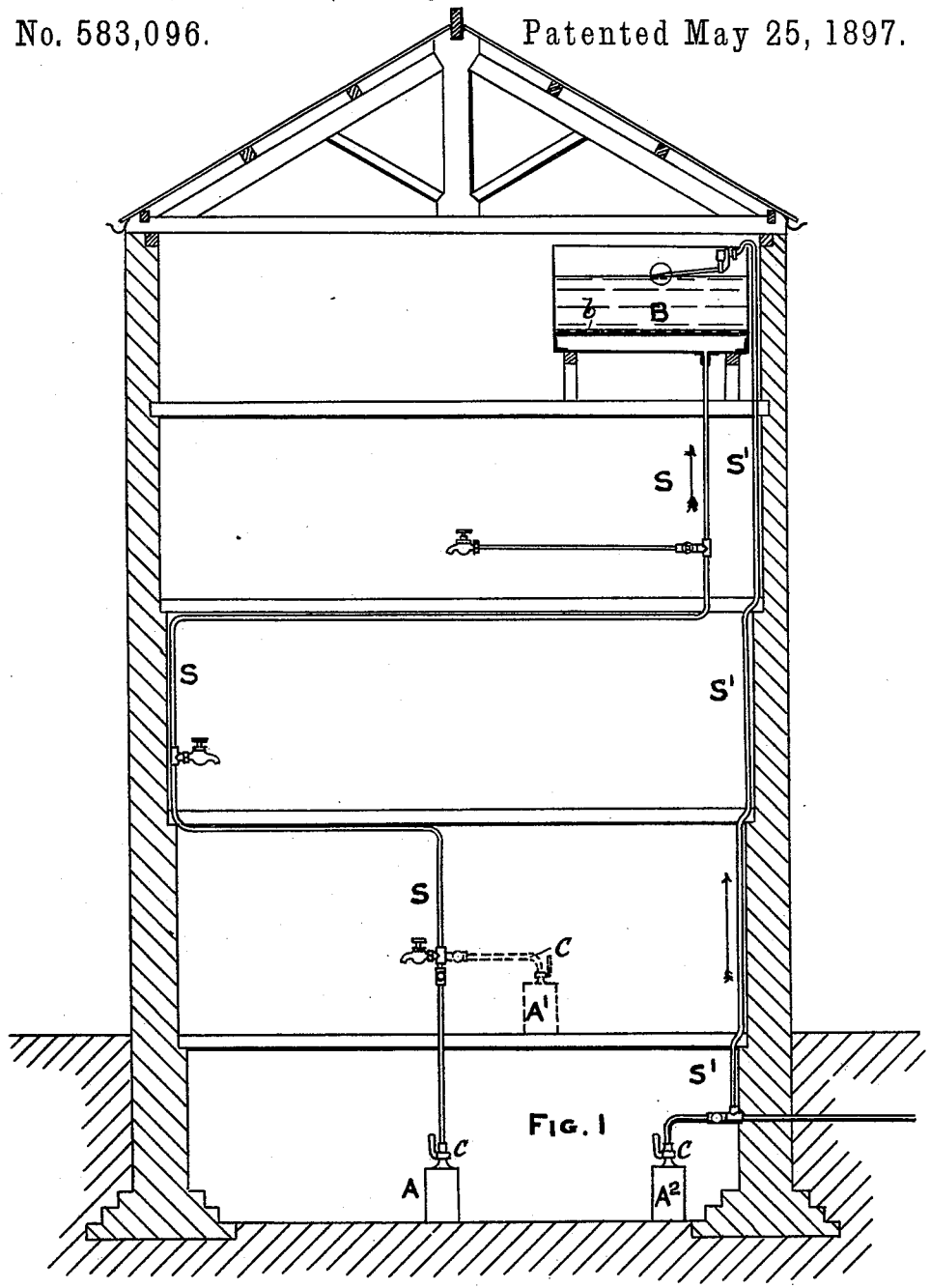

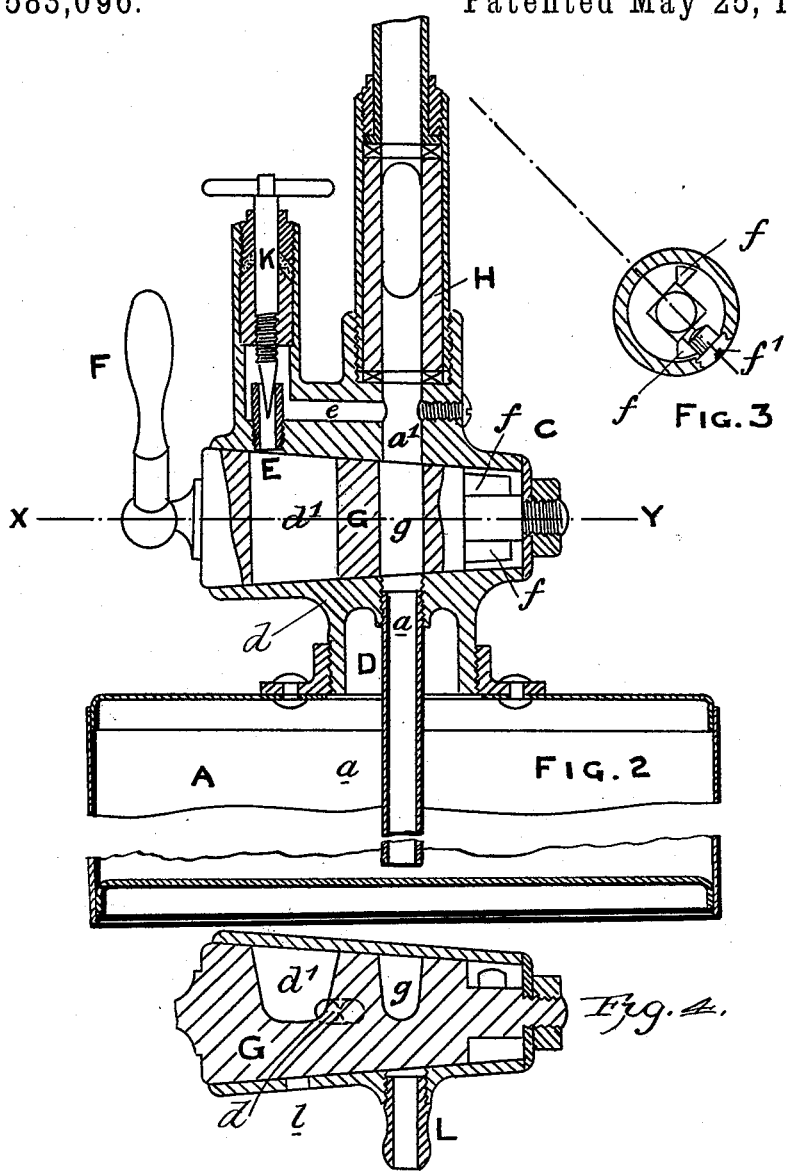

UNITED STATES PATENT OFFICE.

GEORGE STEVENS, OF LONDON, ENGLAND.

METHOD OF AND MEANS FOR PREVENTING SOLIDIFICATION BY FROST, &c., OF LIQUIDS IN PIPES.

SPECIFICATION forming part of Letters Patent No. 583,096, dated May 25, 1897.

Application filed August 3, 1896. Serial No. 601,469. (No model.)

*To all whom it may concern:*

Be it known that I, GEORGE STEVENS, residing at London, England, have invented an Improved Method of and Means for the Prevention of the Solidification by Frost or other Causes of Liquids in Pipes and Adjuncts, of which the following is a specification.

This invention relates to an improved method of and means for the prevention of the solidification of liquids by frost or other causes in supply-pipes, cisterns, and adjuncts, avoiding the bursting of pipes by frost and insuring an uninterrupted supply to cisterns and boilers, and preventing the stagnation of liquids in such pipes or adjuncts.

To carry out my invention, I cause a series of globules of air to travel through the liquids contained in the supply-pipes, cisterns, or adjuncts, the air-globules being caused to enter by a communication-pipe and thereafter to travel throughout the piping and adjuncts by their buoyancy, either in the same direction or opposite to that of the flow of liquid in the pipes, and in order that my invention may be the better understood I now proceed to describe the same in reference to the drawings hereto annexed and to the letters marked thereon.

Like letters refer to similar parts in the various figures.

Figure 1 shows in section the adaptation of my invention to a domestic dwelling. Fig. 2 is an enlarged section through the control device and air-container. Fig. 3 is an end view of the cock and plug of the control device, and Fig. 4 is a sectional plan of the same through X Y. Fig. 5 is an elevation of the air-container with artificially-heating gas-jet and siphon-pipe attached for discharge of accumulated water. Fig. 6 is a section through the port $d'$ in the cock $c$. Fig. 7 is a section through the port $g$ of the cock $c$. Fig. 8 is a detail section and plan of the observation-glass. Fig. 9 is a detail section and sectional plan of the metallic case surrounding the observation-glass.

It is obvious that the disposition of the service-pipes, cisterns, and adjuncts will depend upon the arrangements that have to be dealt with to prevent the liquids from becoming frozen or solidified in the pipes, cisterns, or adjuncts, but in each arrangement of pipes, &c., I carry out my invention by applying to either the supply system of pipes or to the discharge system of pipes or to the cisterns or receptacles containing water or liquid my automatic air-container, (compressing and distributing globules of air,) preferably at the lowest accessible point or end of such system of pipes, cisterns, or receptacles, so that the head or pressure of liquid or water may be utilized, as hereinafter described, to compress the air and to cause it to enter the said pipes or adjuncts, and the buoyancy of the air-globules in the surrounding liquid is utilized to cause an effective and rapid motion of the globules of air either with or against the direction of the flow of liquid in the pipes.

As an example, I will describe the adaptation of my invention to a house-service in Fig. 1.

I attach an air-container at the lowest available part or end of the pipe-service, as at A in the basement, or at A' on the ground floor on the downward supply-pipes S, or at $A^2$ at the lowest point of the upward supply-service S', leading to the cistern B, where there is intermittent or constant supply.

The attachment-pipe of my air-container to the service-pipe passes through a special control or regulating device C, and a water-pipe $a$ is carried almost down to the bottom of the container. The water under pressure so admitted from the service-pipes seals the bottom of the pipe $a$ and compresses the air contained in the upper part of the air-container (which may be easily recharged, as hereinafter described) and forces the air through the annulus D, situated at the highest point of the container surrounding the water-pipe $a$, the passage $d$, through the orifice $d'$ in the plug G, and the valve-controlled seating E and passage $e$ in the form of globules into the descending column of water from the service-pipes. The moment the air-globules enter the water-pipes they rise rapidly by their inherent buoyancy and traverse the service-pipes. However, they may be disposed, as shown by way of example in Fig. 1, to their highest point of outlet or supply in the service-cistern, even against any ordinary downward flow of the liquid itself in the pipes. The air-discharge into the cistern B may be received under a false bottom or baffle-plate $b$, provided with a number of orifices to distribute the ascending globules of air uniformly throughout the cistern. It has been found that such circulation of globules of atmospheric air through the water or liquids standing in pipes or in cisterns effectually prevents the congelation and solidification of the liquid or water in the pipes or cisterns under all ordinary circumstances of low temperature, such as during frost. The compression of the air by the water-pressure tends slightly to raise the temperature of the circulating air-globules, but where extreme degrees of cold are to be met the air contained therein may be artificially warmed by a lamp or gas-jet P, Fig. 5, applied externally to the lower part of the container, and thus to the water delivered into the container from the service-pipes, and the pipes, tanks, container, and adjuncts may also, if desired, be coated with felt R, Fig. 5, or other non-conducting material to protect the contents from external cold.

The construction of my regulator and control device is as follows: The plug G of the control device C, operated by the handle F, is capable of a rotation through ninety degrees between its extreme positions of circulation of operation and recharge, the travel of the cock being limited by stops $ff$ at the end of the plug abutting against a set-screw $f'$. The set-screw $f'$ has screw-threads about its head, screwed into the casing of the cock $c$ and projecting inward sufficiently to make a stop for the wings $f$ on the plug $c$ to limit its travel. In the central position all orifices are closed and the apparatus is out of operation.

In one extreme position, as shown in Figs. 2, 3, and 4, the slot $g$ in the plug G effects communication between the service-pipe and the internal water-pipe $a$, allowing a small quantity of water continuously to enter the air-chamber by the passage $a'$ and to compress and discharge the superincumbent air through the passage $d$ in the casing, and the slot $d'$ in the plug G to the tube E, over which is fitted a taper screw-threaded regulating-valve K with movable key. In order to protect the seating of the tube E from the action of water, it is raised above the floor of the passage $e$ in the plug-casing, through which the air (formed into globules as it passes the spindle-valve K) passes into the water-pipe $a'$ and thence to the service-pipes. The speed of issue of the globules of air can be nicely regulated by the spindle-valve K.

The store of compressed air in a comparatively small container will provide a succession of air-globules for many days, or even a week, until the air charge is eventually exhausted and replaced by water.

The air-container can now be recharged automatically by moving over the cut-off plug G to its other extreme position. In this position the slot $g$ of the plug G closes the communication of the service-pipe with the internal pipe $a$ of the container and opens the latter to an exit-nozzle L, to which is attached a pipe of metal or india-rubber to form a siphon M, Fig. 5, carried below the container A to a drain or bucket N, Fig. 5. At the same time the slot $d'$ in the plug G closes the communication of the air-passage $d$ with the tube E and opens the former to the atmosphere by the orifice $l$ in the cock-casing. The atmosphere can thus freely enter the container A, while the accumulated water is siphoned out through the exit-nozzle L, the remaining charge of compressed air sufficing, if the finger is placed on the orifice $l$, easily to commence such siphonage of discharge. The container A is thus recharged with air and ready for a continuance of its automatic circulating action upon reversal of the cock G by the handle F to its first-described position.

For the convenience of inspection as to rapidity of motion of the air-globules an inspection-glass H, protected by a slotted metal case H', Fig. 5, is inserted between the container A and the service-pipes.

The detail action of the water-pressure with respect to the compressed air is as follows: The descending pressure column of water from main and the compressed air in receiver are in equilibrium of pressure at point of mutual contact, but the injected stream of air enters the water column at, say, some eighteen inches above the level of the water in the receiver, and thus enters the water column at the pressure due to whole length of water column at a point, say, eighteen inches above the lowest point of the water-pressing column, where the water-pressure is less by the difference of that eighteen inches of water. Thus the air-injected bubbles actually enter the water-main at a slightly higher expansion-pressure than that of the water at the point of entry. The weight of eighteen inches of the unbalanced water column has to support the weight of a similar column of compressed air whose weight may be disregarded.

Having now described my invention, what I claim, and desire to secure by Letters Patent, is—

1. The herein-described method of preventing freezing of liquids in pipe systems consisting in applying the pressure of the water in the pipes to a body of air and introducing said air under said pressure into the pipe system in a regulated quantity to form globules, substantially as described.

2. In combination, with the pipe system, an air-tank or compressed-air holder, said tank being connected with the water-pipes to receive the pressure therefrom for compressing the air and having an independent passage leading to the pipe system for introducing the compressed air into the same.

3. The combination with pipes, cisterns and adjuncts, forming any system for transmission of liquid, of an air-container attached to the lowest point of said service system, adapted to admit liquid from service-pipes to bottom of air-container, and to allow egress of compressed air at the highest point from said container in globules to service system, to effect automatic circulation of compressed-air globules through said service system, to prevent solidification of liquids therein.

4. Apparatus to prevent solidification of liquids in pipes or adjuncts, consisting of, in combination, an air-container, a water-admission pipe thereto, extending adjacent to bottom of container, an air-egress at the highest point of container, and a cut-off air and water supply cock, substantially as described.

5. Apparatus to prevent solidification of liquids in pipes or adjuncts, consisting of, in combination, an air-container, a water-admission pipe thereto, extending adjacent to the bottom of container, an air-egress at the highest point of container, a control device between attachment device and container, consisting of a cut-off air and water supply cock, a regulating spindle-valve and an inspection-glass in said cut-off cock, orifices and passages in cock-casing and container, and a union attachment to service-pipes, adapted to admit water-pressure from service system to bottom of container, and egress of compressed-air globules to regulating-valve and thence to service-pipes, substantially as described.

6. In apparatus to prevent solidification of liquids, and in combination with the compressed-air tank and service-pipes, an air and water cut-off device, consisting of a rotating reversible plug G, operated by a handle F, stops on plug and set-screw in casing to limit extreme positions of plug; two slot-passages $g$ $d'$ in plug, three orifices, $a$ $a'$ and L in casing of plug, controlled by and communicating with slot $g$, and orifices $d$ E and $l$, controlled by and in communication with slot $d'$ the said passage $d'$ and orifices $d$, E, and $l$ controlling the air-supply to the tank and system, while the passage $g$ and orifices $a$, $a'$ and L control the water-supply, substantially as and for the purposes described.

7. In apparatus to prevent solidification of liquids a tube-seating E in control device casing, a regulating screw-threaded spindle-valve K; a passage $e$ to service-pipe attachment, and an inspection-glass H to regulate size and rapidity of compressed-air globules passing into the service system, substantially as described.

8. In an apparatus to prevent solidification of liquids an internal water-supply pipe in air-container, a slot in cut-off plug-cock an egress-nozzle L in cock-casing, and an added outer pipe to said nozzle to form a discharge-siphon for the water in container during recharge.

9. In an apparatus to prevent solidification of liquids, the combination with the pipe system, a tank connected therewith in which air is compressed by the pressure of the water and a heat-giving device, such as a lamp, or gas-jet, with the exterior of the air-transmitting devices, to heat the globules of air before circulation through the said service system.

In testimony whereof I have signed my name to this specification in the presence of two subscribing witnesses.

GEORGE STEVENS.

Witnesses:
RICHARD A. HOFFMANN,
CHARLES H. CARTER.